United States Patent
Takata et al.

(10) Patent No.: US 10,338,296 B2
(45) Date of Patent: Jul. 2, 2019

(54) DISPLAY APPARATUS

(71) Applicant: Panasonic Intellectual Property Management Co., Ltd., Osaka (JP)

(72) Inventors: Kazumasa Takata, Osaka (JP); Wahei Agemizu, Osaka (JP); Kenji Takamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/890,942

(22) Filed: Feb. 7, 2018

(65) Prior Publication Data
US 2018/0267227 A1 Sep. 20, 2018

(30) Foreign Application Priority Data
Mar. 16, 2017 (JP) .................................. 2017-050678

(51) Int. Cl.
*F21V 8/00* (2006.01)

(52) U.S. Cl.
CPC ........... *G02B 6/0036* (2013.01); *G02B 6/006* (2013.01); *G02B 6/0055* (2013.01); *G02B 6/0068* (2013.01); *G02B 6/003* (2013.01)

(58) Field of Classification Search
CPC .. G02B 6/0068; G02B 6/0036; G02B 6/0055; G09F 13/04; G09F 13/0409; G09F 13/08; G09F 13/0413
See application file for complete search history.

(56) References Cited

U.S. PATENT DOCUMENTS

| 4,965,950 | A | * | 10/1990 | Yamada | .................... | B60Q 1/56 362/613 |
| 6,971,758 | B2 | * | 12/2005 | Inui | ....................... | G02B 6/0018 362/23.01 |
| 2001/0049893 | A1 | | 12/2001 | Maas et al. | | |

(Continued)

FOREIGN PATENT DOCUMENTS

| JP | 2006-075362 | 3/2006 |
| JP | 2008-070697 | 3/2008 |

(Continued)

OTHER PUBLICATIONS

The Extended European Search Report dated Jul. 27, 2018 for the related European Patent Application No. 18154032.9.

*Primary Examiner* — Mariceli Santiago
(74) *Attorney, Agent, or Firm* — Panasonic IP Management; Kerry S. Culpepper

(57) ABSTRACT

A display apparatus includes: a light guide plate; a light source that causes light to be incident on an end surface of the light guide plate; a hiding plate that is provided on a side of an emission surface of the light guide plate, and that includes a light transmission part which transmits light emitted from the emission surface and a light shielding part which has lower light transmittance than the light transmission part; and a colored board that has light reflectance closer to light reflectance of the light shielding part than light reflectance of the light transmission part in each wavelength, and that is provided on a side of a reflection surface of the light guide plate so as to overlap the light transmission part of the hiding plate when viewed from a direction perpendicular to the emission surface of the light guide plate.

7 Claims, 11 Drawing Sheets

(56) References Cited

U.S. PATENT DOCUMENTS

| | | | |
|---|---|---|---|
| 2002/0140880 A1* | 10/2002 | Weindorf | G02B 6/0023 349/70 |
| 2008/0066355 A1 | 3/2008 | Misawa et al. | |
| 2009/0219734 A1 | 9/2009 | Sawada et al. | |
| 2010/0101127 A1* | 4/2010 | Chen | G02B 6/0021 40/582 |
| 2011/0167690 A1 | 7/2011 | Bjarnason et al. | |
| 2012/0063167 A1* | 3/2012 | Ozawa | G02B 6/0031 362/609 |
| 2012/0257119 A1* | 10/2012 | Hosoki | G02B 6/0056 348/725 |
| 2015/0316699 A1* | 11/2015 | Shimizu | G02B 6/0043 348/790 |
| 2016/0313496 A1* | 10/2016 | Hirayama | G02B 6/0036 |

FOREIGN PATENT DOCUMENTS

| | | |
|---|---|---|
| JP | 2009-204885 | 9/2009 |
| JP | 2016-180823 | 10/2016 |
| JP | 2017-032915 | 2/2017 |

\* cited by examiner

US 10,338,296 B2

DISPLAY APPARATUS

BACKGROUND

1. Technical Field

The present disclosure relates to a display apparatus which displays information, such as a letter, a figure, or a pattern, in an electronic machine or the like.

2. Description of the Related Art

In the related art, there is a display apparatus, which includes a transparent light guide plate and light sources, such as LEDs, that cause light to be incident on end surfaces of the light guide plate, as disclosed in, for example, Japanese Patent Unexamined Publication No. 2016-180823. In a case where light, which is incident on the end surfaces of the light guide plate, is propagated inside the light guide plate and is reflected in prisms formed on a reflection surface of the light guide plate, light is emitted from an emission surface which faces the reflection surface. In a case where the prisms are provided in appropriate shapes and locations and the light sources are caused to emit light, information, such as a letter, a figure, or a pattern, is displayed.

In a case where the light sources are disposed in a plurality of places along the plurality of end surfaces of the light guide plate and the light sources are respectively switched between on and off, it is possible to switch between and display a plurality of pieces of information in one display area. Here, there is a case where a hiding plate is used to hide light sources. The hiding plate includes a light transmission part that transmits light in order to display information and a light shielding part that has lower light transmittance than the light transmission part. The light sources are hidden by the light shielding part.

SUMMARY

According to the present disclosure, there is provided a display apparatus including: a light guide plate that propagates light which is incident from an end surface of the light guide plate, that reflects light using prisms provided on a reflection surface of the light guide plate, and that emits light from an emission surface of the light guide plate, the emission surface faces the reflection surface; a light source that causes light to be incident on the end surface of the light guide plate; a hiding plate that is provided on a side of the emission surface of the light guide plate, and that includes a light transmission part which transmits light emitted from the emission surface and a light shielding part which has lower light transmittance than the light transmission part; and a colored board that has light reflectance closer to light reflectance of the light shielding part than light reflectance of the light transmission part in each wavelength, and that is provided on a side of the reflection surface of the light guide plate so as to overlap the light transmission part of the hiding plate when viewed from a direction perpendicular to the emission surface of the light guide plate.

According to the display apparatus of the present disclosure, the colored board that has light reflectance close to the light shielding part (that is, close to a color of the light shielding part) is provided on the side of the reflection surface of the light guide plate so as to overlap the light transmission part of the hiding plate. Therefore, even in a case where the light source is off, it is possible to make a boundary between the light transmission part and the light shielding part to be hard to be conspicuous. Accordingly, even in a case where the light source is off, it is possible to acquire a display apparatus having good appearance.

DETAILED DESCRIPTIONS

Problems according to the related art will be described in brief before describing embodiments.

In a case where the hiding plate is provided in a display apparatus disclosed in Japanese Patent Unexamined Publication No. 2016-180823 and all of the plurality of light sources are in off states, the light transmission part and the light guide plate of the hiding plate become transparent due to light from the outside, and thus a side of a bottom surface of the light guide plate is seen and the light sources are hidden by the light shielding part. Therefore, the boundary between the light transmission part and the light shielding part of the hiding plate is conspicuous, and thus there is a problem in that appearance is bad in a case where the light sources are off. The present disclosure is made to solve the above problem according to the related art, and an object of the present disclosure is to provide a display apparatus having good appearance even in a case where the light sources are off.

Hereinafter, respective embodiments of the present disclosure will be described with reference to the accompanying drawings.

First Embodiment

Figure 1A:
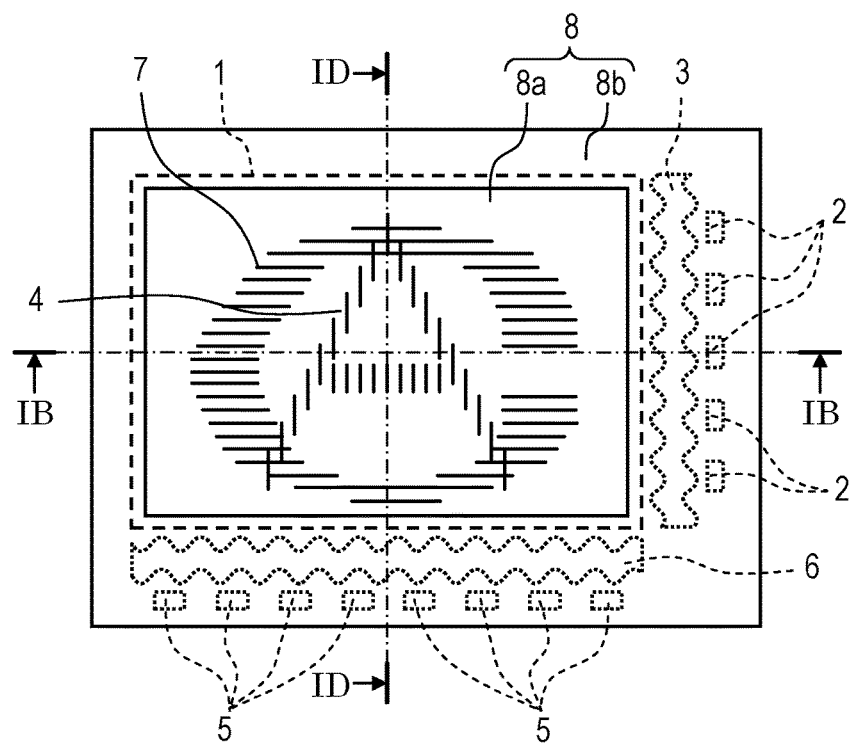
FIG. 1A is a front view illustrating a display apparatus according to a first embodiment of the present disclosure.
Figure 1B:
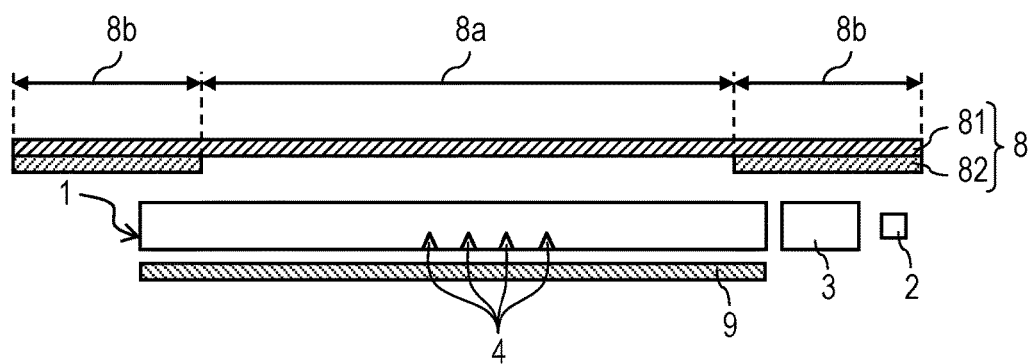
FIG. 1B is a sectional view taken along line IB-IB in FIG. 1A illustrating the display apparatus according to the first embodiment of the present disclosure.
Figure 1C:
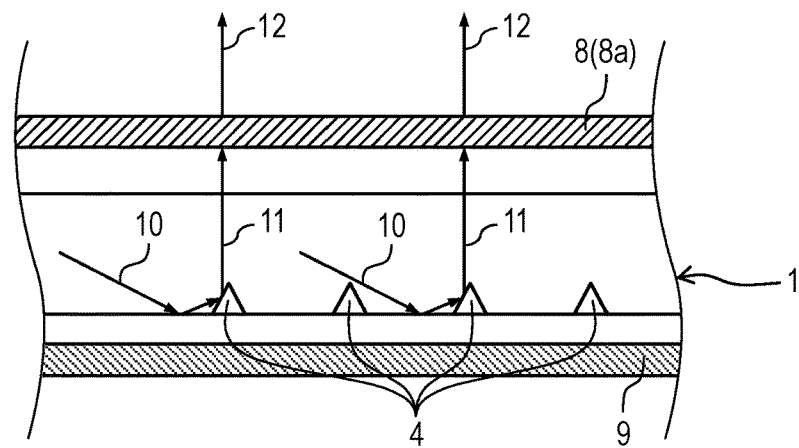
FIG. 1C is a view illustrating a state of progress of light in FIG. 1B.
Figure 1D:
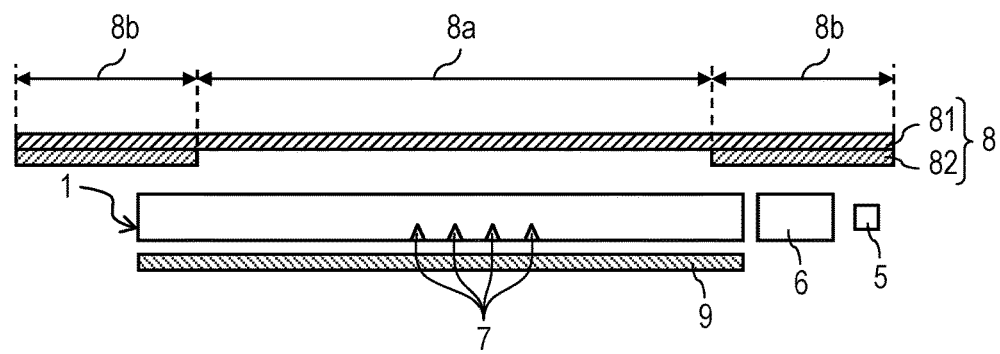
FIG. 1D is a sectional view taken along line ID-ID in FIG. 1A illustrating the display apparatus according to the first embodiment of the present disclosure.
Figure 1E:
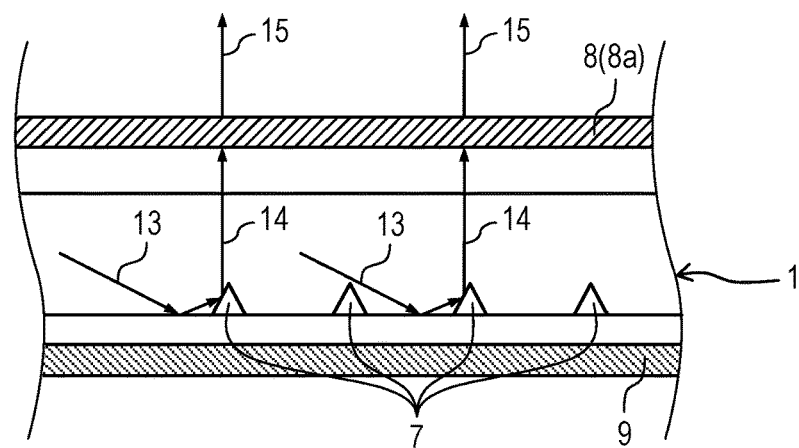
FIG. 1E is a diagram illustrating a state of progress of light in FIG. 1D.

FIGS. 1A to 1E illustrate a display apparatus according to a first embodiment of the present disclosure. FIG. 1A is a front view illustrating the display apparatus, FIG. 1B is a sectional view taken along line IB-IB in FIG. 1A, FIG. 1C is a view illustrating a state of progress of light in FIG. 1B, FIG. 1D is a sectional view taken along line ID-ID in FIG. 1A, and FIG. 1E is a diagram illustrating a state of progress of light in FIG. 1D.

The display apparatus according to the first embodiment of the present disclosure includes light guide plate 1, a plurality of light sources 2 that are provided with respect to one end surface of light guide plate 1, optical system 3 that causes light emitted from light sources 2 to be incident on light guide plate 1, a plurality of light sources 5 that are provided with respect to another end surface of light guide plate 1, and optical system 6 that causes light emitted from light sources 5 to be incident on light guide plate 1. Light sources 2 and 5 are, for example, LEDs, and optical systems 3 and 6 are, for example, lenses. Meanwhile, in FIG. 1A, colored board 9 is not illustrated.

In addition, prisms 4 (which display, for example, a letter "A" as an assembly) and prisms 7 (which display, for example, a letter "C" as an assembly), which prepare information, such as a letter, a figure, or a pattern as an assembly, are formed on a bottom surface (there is a case of being called reflection surface) of light guide plate 1. Hiding plate 8 is installed on an upper surface (there is a case of being called an emission surface) of light guide plate 1.

A configuration illustrated in FIG. 1A will be supplementarily described with reference to FIGS. 1B and 1D. Hiding plate 8 installed on a side of the upper surface of light guide plate 1 includes light transmission layer 81 that transmits light, and light shielding layer 82 that shields light. Light transmission layer 81 and light shielding layer 82 are formed of a coating material, such as ink, a vapor deposited film, or the like. Light transmission layer 81 is formed on a whole surface of hiding plate 8, and has a color such as black, brown, beige, gray, or white. Light shielding layer 82 is provided to partially overlap light transmission layer 81 in order to hide light sources 2 and 5 and optical systems 3 and 6. Hereinafter, a part, which does not overlap light shielding layer 82 and includes only light transmission layer 81, is set to light transmission part 8*a*, and a part in which light transmission layer 81 overlaps light shielding layer 82 is set to light shielding part 8*b*. Light shielding part 8*b* has lower light transmittance than light transmission part 8*a*.

On a side of the bottom surface of light guide plate 1, colored board 9 is provided to overlap light transmission part 8*a* (whole area) when viewed from the upper surface of light guide plate 1 or from a direction perpendicular to the bottom surface. Colored board 9 overlaps light shielding part 8*b* at an edge part thereof. In addition, colored board 9 has light reflectance closer to light reflectance of light shielding part 8*b* than light reflectance of light transmission part 8*a* in each wavelength. That is, colored board 9 has a color which is close to light shielding part 8*b* and, preferably, a color in the same system as light shielding part 8*b*.

An appearance of the display apparatus which is configured as described above will be described with reference to FIGS. 1C and 1E. FIG. 1C illustrates a situation in which light emitted from light sources 2 progresses in a section taken along line IC-IC of FIG. 1A. Rays of light 10, which are incident on light guide plate 1 from light sources 2 after passing through optical system 3, are propagated while repeating total reflection in light guide plate 1. Light, which stuck prisms 4, is reflected upward, and becomes rays of light 11 which burst out from light guide plate 1. Rays of light 11 pass through light transmission part 8*a* of hiding plate 8, and passed rays of light 12 are seen. Since rays of light 12 are generated from respective prisms 4, information, such as a letter, a figure, or a pattern, as an assembly of prisms 4 is displayed as a whole. In this case, the letter "A" is displayed.

FIG. 1E illustrates a situation in which light emitted from light sources 5 progresses in a section taken along line IE-IE of FIG. 1A. Rays of light 13, which are incident on light guide plate 1 from light sources 5 after passing through optical system 6, are propagated while repeating total reflection in light guide plate 1. Light, which stuck prisms 7, is reflected upward, and becomes rays of light 14 which burst out from light guide plate 1. Rays of light 14 pass through light transmission part 8*a* of hiding plate 8, and passed rays of light 15 are seen. Since rays of light 15 are generated from respective prisms 7, information, such as a letter, a figure, or a pattern, as an assembly of prisms 7 is displayed as a whole. In this case, the letter "C" is displayed. Therefore, it is possible to display two pieces of information in one display area. That is, light sources 2 and light sources 5 are provided at a plurality of respective places such that light is caused to be incident on a plurality of end surfaces of light guide plate 1 and different pieces of information (the letter "A" and the letter "C") are respectively displayed according to the end surfaces into which light is incident.

In addition, in a case where neither of light sources 2 nor 5 do emit light (off state), light transmission part 8*a* and light guide plate 1 become transparent, and thus colored board 9 is seen and the letters "A" and "C" are not seen. In a case where colored board 9 is not provided, light transmission part 8*a* and light guide plate 1 become transparent due to light from the outside, with the result that the side of the bottom surface of the light guide plate 1 is seen, and thus the boundary between light transmission part 8a and light shielding part 8b is conspicuous. However, on the side of the bottom surface of transparent light guide plate 1, colored board 9 that has a color close to light shielding part 8b is provided to overlap light transmission part 8a of hiding plate 8. That is, since the edge part of colored board 9 overlaps light shielding part 8b, it is possible to make the boundary between light transmission part 8a and light shielding part 8b to be hard to be conspicuous. Accordingly, even in a case where both light sources 2 and 5 are off, it is possible to acquire a display apparatus having good appearance.

Meanwhile, prisms 4 and prisms 7 are approximately orthogonal. Even though light emitted from light sources 2 is reflected in prisms 7, light emitted from light sources 2 is not emitted upward from light guide plate 1. Therefore, in a case where light sources 2 shine, only the assembly of prisms 4 is seen as shining. In contrast, even in a case where light emitted from light sources 5 is reflected in prisms 4, light emitted from light sources 5 is not emitted upward from light guide plate 1. Therefore, in a case where light sources 5 shine, only the assembly of prisms 7 is seen as shining.

Figure 2:
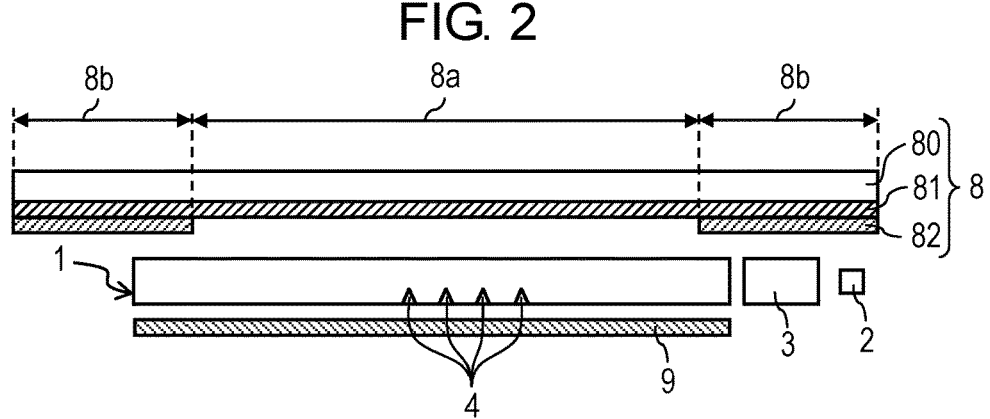
FIG. 2 is a sectional view illustrating another aspect of the display apparatus according to the first embodiment of the present disclosure.

However, hiding plate 8 may be acquired in such a way that light shielding layer 82 is provided on light transmission layer 81 formed by a material, such as a plate having a light transmitting property, or may be acquired in such a way that light transmission layer 81 and light shielding layer 82 are formed on a transparent film, which becomes a base, and transparent plate 80 as illustrated in FIG. 2. In the same manner, colored board 9 may be a plate which has a light shielding property, and may be a plate acquired in such a way that a colored layer is laminated on the transparent film, which becomes the base, and the transparent plate.

Figure 3:
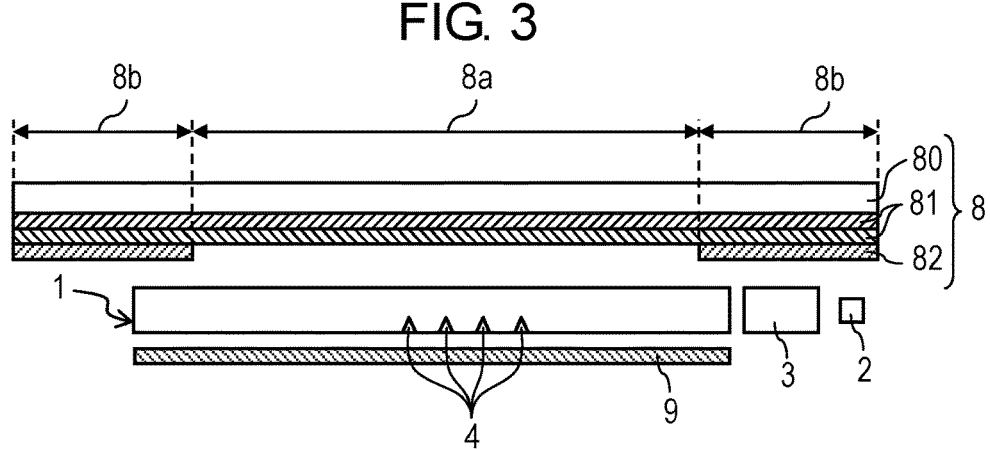
FIG. 3 is a sectional view illustrating further another aspect of the display apparatus according to the first embodiment of the present disclosure.
Figure 4:
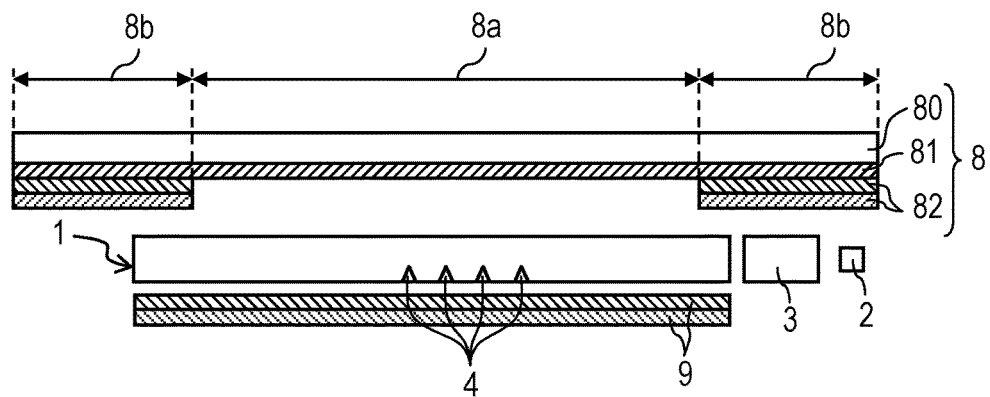
FIG. 4 is a sectional view illustrating still another aspect of the display apparatus according to the first embodiment of the present disclosure.

In addition, light transmission layer 81 may be formed in such a way that a plurality of layers having a light transmitting property overlap as illustrated in FIG. 3, and light shielding layer 82 and colored board 9 may be formed in such a way that a plurality of layers overlap as illustrated in FIG. 4. At least any one of the plurality of layers, which form light shielding layer 82 or colored board 9, may include the light shielding property.

In addition, it is preferable that light transmittance of light transmission part 8a (light transmission layer 81) is greater than 1% and less than 50%. In a case where the light transmittance is equal to or less than 1%, it is difficult to see because the amount of transmission of light is small. In order to easily see, it is necessary to cause the light sources to emit light with high intensity, and thus power consumption is large. Otherwise, it is necessary to use high-luminance light sources, thereby being expensive.

In addition, even in a case where colors of light shielding layer 82 and colored board 9 are close, there is a case where the boundary between the light transmission part 8a and the light shielding part 8b appears in a case where the light sources are off. In light transmission part 8a, light from the outside passes through light transmission layer 81 and light guide plate 1, is reflected in colored board 9, and enters eyes of a person. In contrast, in light shielding part 8b, light from the outside passes through light transmission layer 81, is reflected in light shielding layer 82, and enters eyes of a person. Therefore, a distance until light from the outside is reflected and enters eyes of a person is different in light transmission part 8a and light shielding part 8b. In a case where the light transmittance is less than 50%, it is possible to make the boundary hard to be conspicuous by blurring the boundary.

In addition, light shielding part 8b has the light shielding property to the extent that light, which is emitted from the light sources and passes through light shielding part 8b, is not recognized by eyes of a person. It is necessary that the light transmittance of light shielding part 8b is lower than the light transmittance of light transmission part 8a, and, specifically, it is preferable that the light transmittance of light shielding part 8b is equal to or less than 1%.

Meanwhile, the embodiment provides an aspect in which light sources 2 and 5 are disposed at two places such that light is incident on two orthogonal end surfaces of light guide plate 1 and two pieces of information are displayed in one display area. However, light sources 2 and 5 may be disposed at places (two places) which are different from each other such that light is incident on two facing end surfaces of light guide plate 1, and two pieces of information may be displayed in one display area.

Figure 5A:
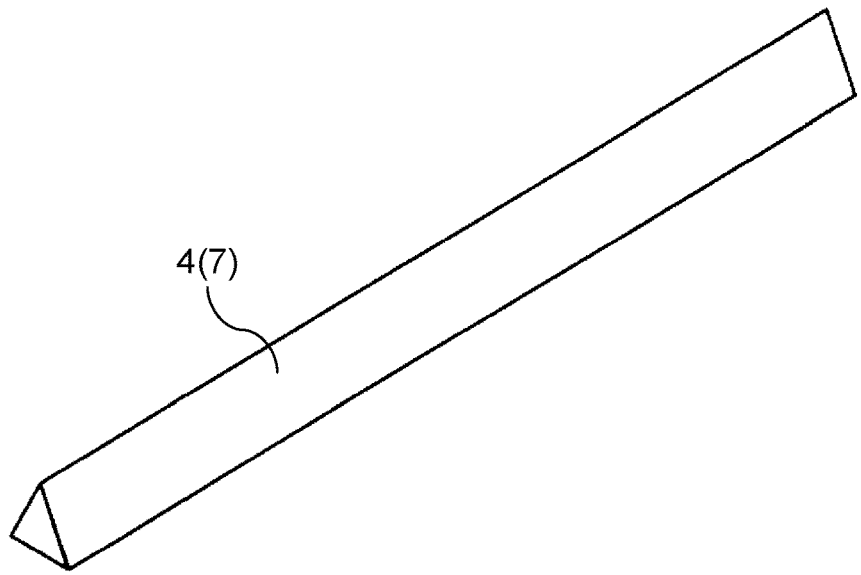
FIG. 5A is a perspective view illustrating an example of a prism provided in a light guide plate of the display apparatus according to the first embodiment of the present disclosure.
Figure 5B:
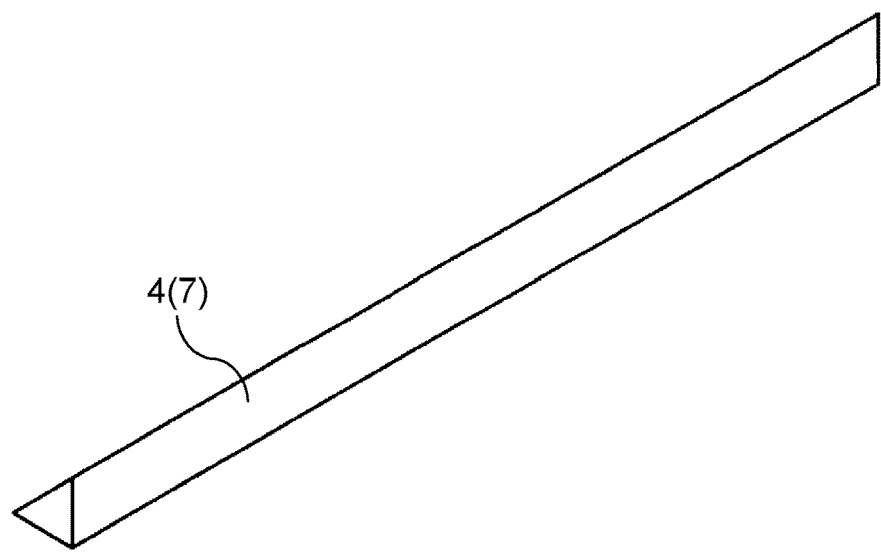
FIG. 5B is a perspective view illustrating an example of a prism according to the first embodiment of the present disclosure.
Figure 5C:
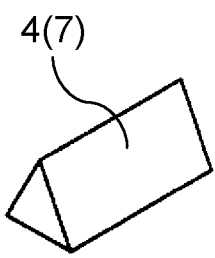
FIG. 5C is a perspective view illustrating an example of a prism according to the first embodiment of the present disclosure.
Figure 5D:
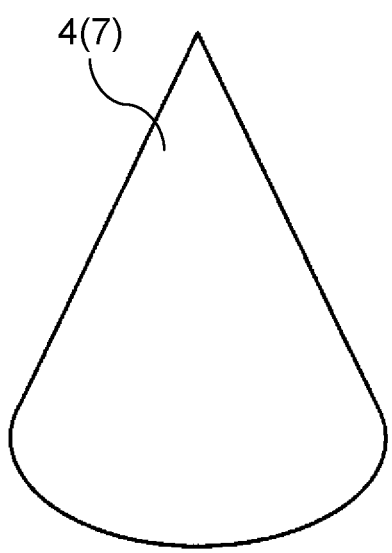
FIG. 5D is a perspective view illustrating an example of a prism according to the first embodiment of the present disclosure.
Figure 5E:
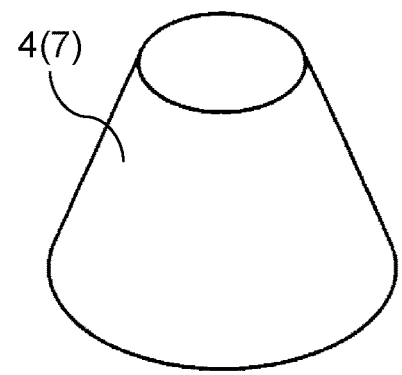
FIG. 5E is a perspective view illustrating an example of a prism according to the first embodiment of the present disclosure.
Figure 5F:
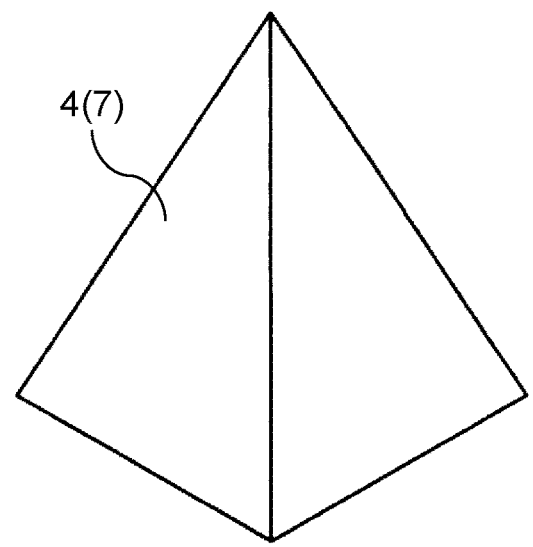
FIG. 5F is a perspective view illustrating an example of a prism according to the first embodiment of the present disclosure.
Figure 5G:
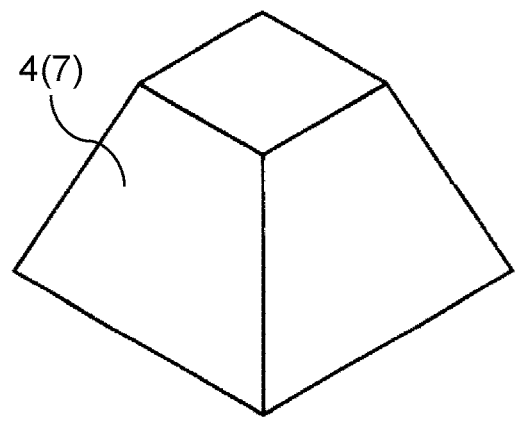
FIG. 5G is a perspective view illustrating an example of a prism according to the first embodiment of the present disclosure.

FIGS. 5A to 5G illustrate shapes of prisms 4 and 7. Originally, prisms 4 and 7 are recesses (that is, spaces) provided in light guide plate 1. However, prisms 4 and 7 are illustrated as corporeal objects in FIGS. 5A to 5G for description. Prisms 4 and 7 may be a long groove which has an approximately isosceles triangle-shaped section as illustrated in FIG. 5A, may be a long groove which has an approximately right-angled triangle-shaped section as illustrated in FIG. 5B, and, further, may be a short groove as illustrated in FIG. 5C. Furthermore, in addition, prisms 4 and 7 may have a conical shape as illustrated in FIG. 5D, may have a form (truncated cone shape) in which an apex part of the conical shape is cut as illustrated in FIG. 5E, may have a pyramid shape as illustrated in FIG. 5F, and may have a form (truncated pyramid shape) in which an apex part of the pyramid shape is cut as illustrated in FIG. 5G. In addition, prisms 4 are not limited to the space, and may be filled with a material which has a smaller reflectivity than light guide plate 1.

Meanwhile, in the embodiment, light sources 2 and 5 are provided along the end surfaces of light guide plate 1, as illustrated in FIGS. 1A, 1B, and 1D. However, the present disclosure is not limited to the aspect. For example, light sources 2 and 5 may be provided on a side of the bottom surface of light guide plate 1 as illustrated in FIG. 6.

Figure 6:
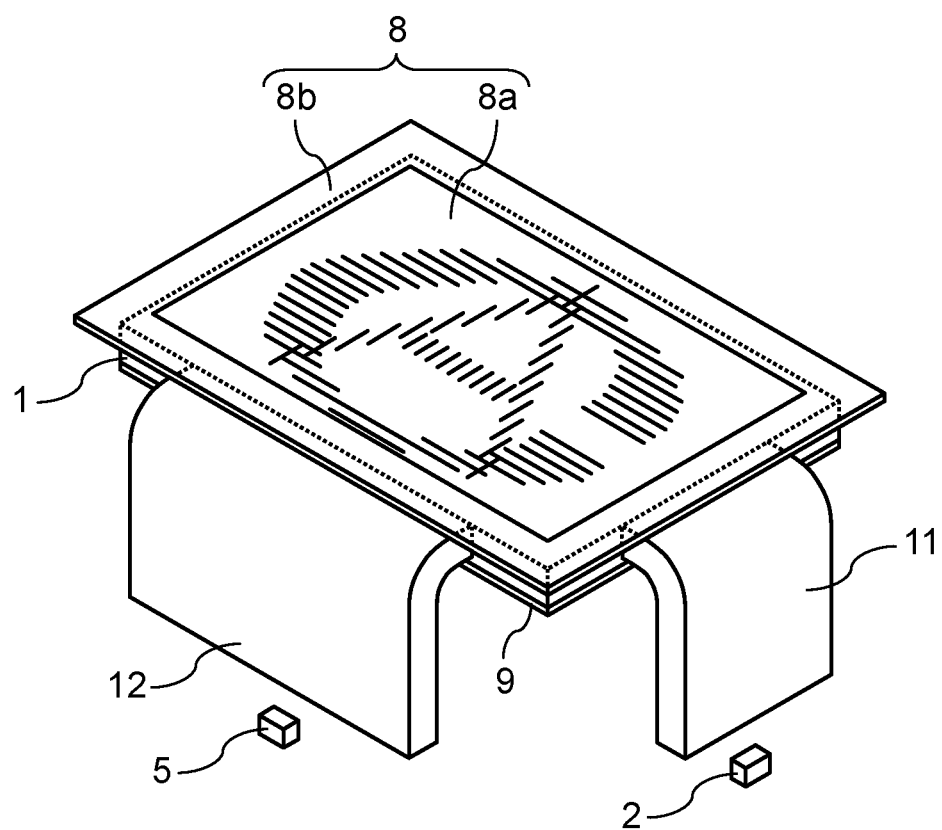
FIG. 6 is a perspective view illustrating still another aspect of the display apparatus according to the first embodiment of the present disclosure.

In FIG. 6, light guide plate 1 includes leg parts 11 and 12 that extend toward the side of the bottom surface from the end surfaces thereof. Light from light sources 2 and 5 is incident on leg parts 11 and 12, respectively, changes a direction after being propagated in leg parts 11 and 12, and is incident on the end surfaces of light guide plate 1. Progress of light thereafter is the same as being described with reference to FIGS. 1C and 1E.

Second Embodiment

Figure 7A:
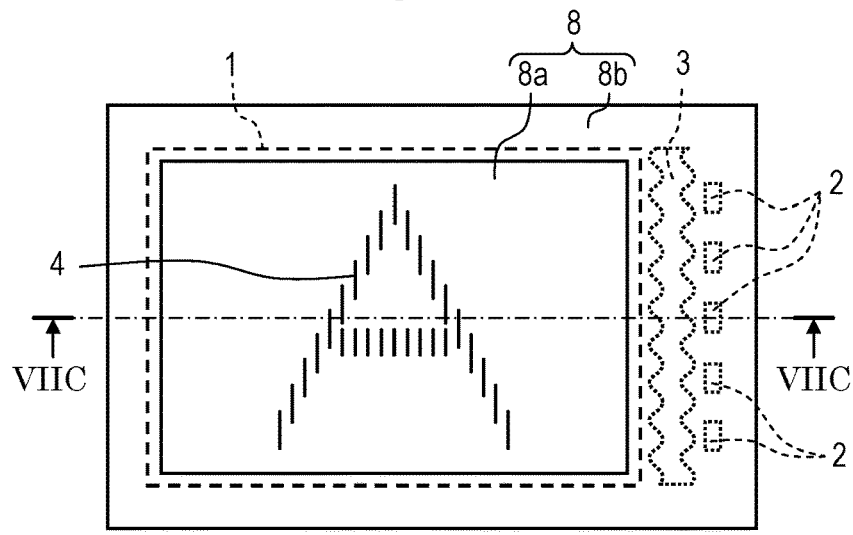
FIG. 7A is a front view illustrating a display apparatus according to a second embodiment of the present disclosure.
Figure 7B:
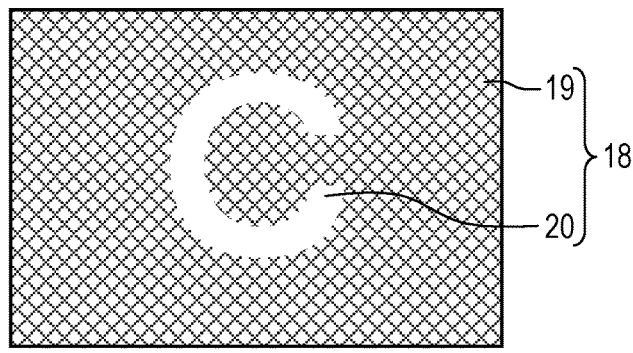
FIG. 7B is a front view illustrating a colored board of the display apparatus according to the second embodiment of the present disclosure.
Figure 7C:
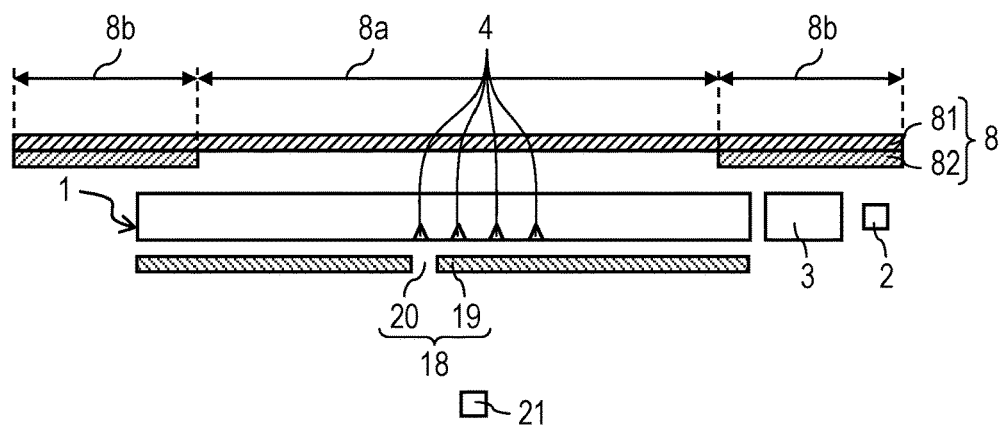
FIG. 7C is a sectional view illustrating the display apparatus according to the second embodiment of the present disclosure taken along line VIIC-VIIC in FIG. 7A.
Figure 7D:
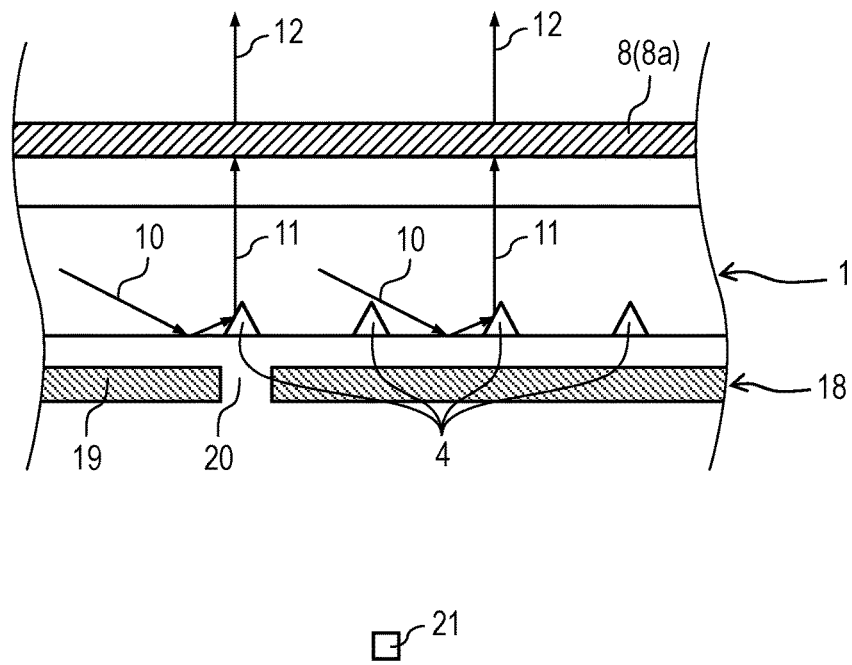
FIG. 7D is a view illustrating a state of progress of light in FIG. 7C.
Figure 7E:
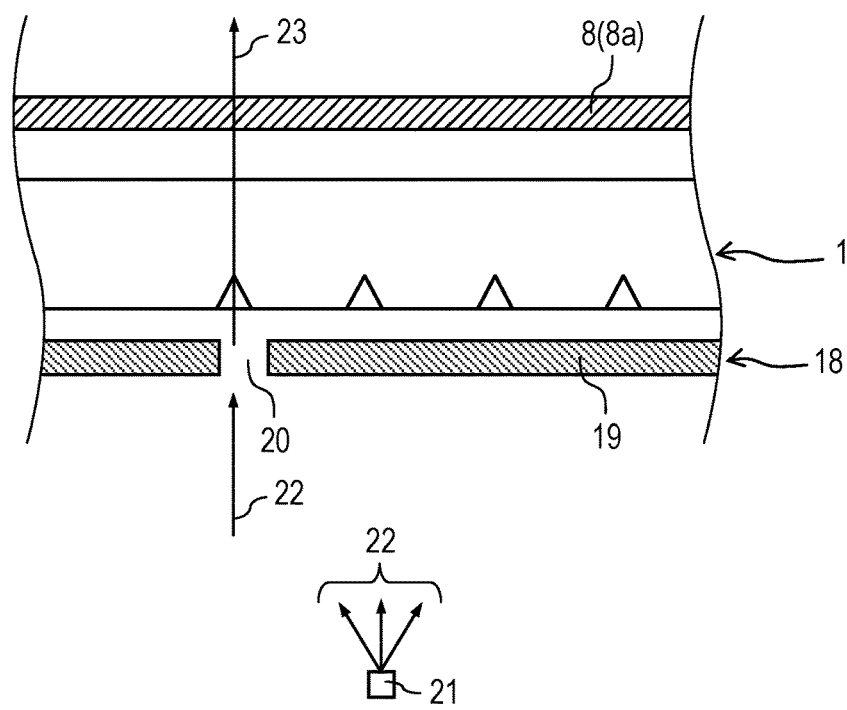
FIG. 7E is a view illustrating the state of progress of light in FIG. 7C.

FIGS. 7A to 7E illustrate a display apparatus according to a second embodiment of the present disclosure. FIG. 7A is a front view illustrating the display apparatus according to the present disclosure, FIG. 7B is a front view illustrating colored board 18, FIG. 7C is a sectional view taken along line VIIC-VIIC of FIG. 7A, and FIGS. 7D and 7E illustrate a state of progress of light in FIG. 7C. Meanwhile, in FIG. 7A, colored board 18 is not illustrated. The same components as in the first embodiment will not be described in detail.

Although the second embodiment is in common with the first embodiment in a fact that the display apparatus includes light guide plate 1, a plurality of light sources 2 that are provided with respect to one end surface of light guide plate 1, and optical system 3 that causes light emitted from light sources 2 to be incident on light guide plate 1, the second embodiment is different from the first embodiment in a fact that the display apparatus does not include a plurality of light sources 5 that are provided with respect to another end surface of light guide plate 1, and optical system 6 that causes light emitted from light sources 5 to be incident on light guide plate 1.

In addition, on a side of a bottom surface of light guide plate 1, colored board 18 is provided, as illustrated in FIG. 7C. Unlike colored board 9 of first embodiment, colored board 18 of the second embodiment includes light transmitting areas 20 that transmit light. Light transmitting areas 20 are, for example, through holes, and have higher light transmittance than another area 19. Light transmitting areas 20 of colored board 18 have areas whose shape is used to prepare information such as a letter, a figure, or a pattern. Second light sources 21 are provided on a side of a further bottom surface than colored board 18. That is, colored board 18 is provided between light guide plate 1 and second light sources 21.

The appearance of the display apparatus which is configured as described above will be described with reference to FIG. 7D and FIG. 7E. FIG. 7D illustrates a situation in which light emitted from light sources 2 progresses in a section taken along line VIID-VIID of FIG. 7A. Rays of light 10, which are incident on light guide plate 1 from light sources 2 after passing through optical system 3, are propagated while repeating total reflection in light guide plate 1. Rays of light 10, which stuck prisms 4, are reflected upward, and become rays of light 11 which burst out from light guide plate 1. Rays of light 11 pass through light transmission part 8a of hiding plate 8, and passed rays of light 12 are seen. Since rays of light 12 are generated from respective prisms 4, information, such as a letter, a figure, or a pattern, as an assembly of prisms 4 is displayed as a whole. In this case, the letter "A" is displayed.

FIG. 7E is a view illustrating the situation in which light emitted from second light sources 21 progresses in a section taken along line VIIE-VIIE of FIG. 7A. In rays of light 22 emitted from second light sources 21, light, which reaches light transmitting areas 20 of colored board 18, selectively passes through colored board 18. The rays of light pass through transparent light guide plate 1 and pass through light transmission part 8a of hiding plate 8, and thus passed rays of light 23 are seen. Since rays of light 23 are generated from respective light transmitting areas 20 of colored board 18, information, such as a letter, a figure, or a pattern, which is formed by light transmitting areas 20, is displayed as a whole. In this case, the letter "C" (refer to FIG. 7B) is displayed.

In addition, in a case where neither light sources 2 nor second light sources 21 emit light, light transmission part 8a and light guide plate 1 become transparent, and thus colored board 18 is seen. In contrast, in a case where colored board 18 is not provided, light transmission part 8a and light guide plate 1 become transparent due to light from the outside, with the result that the side of the bottom surface of light guide plate 1 is seen, and thus the boundary between light transmission part 8a and light shielding part 8b becomes conspicuous. However, since colored board 18 which has a color close to light shielding part 8b is provided to overlap light transmission part 8a of hiding plate 8 on the side of the bottom surface of transparent light guide plate 1, it is possible to make the boundary between light transmission part 8a and light shielding part 8b hard to be conspicuous.

Here, in the embodiment, it is considered that light transmitting areas 20 are provided in colored board 18 and light transmitting areas 20 become conspicuous in a case where neither light sources 2 nor second light sources 21 do shine. However, light transmitting areas 20 are small compared to a total area of colored board 18 as in, for example, the letter "C". Therefore, there is no case where light transmitting areas 20 of colored board 18 stand out and become conspicuous.

Figure 8:
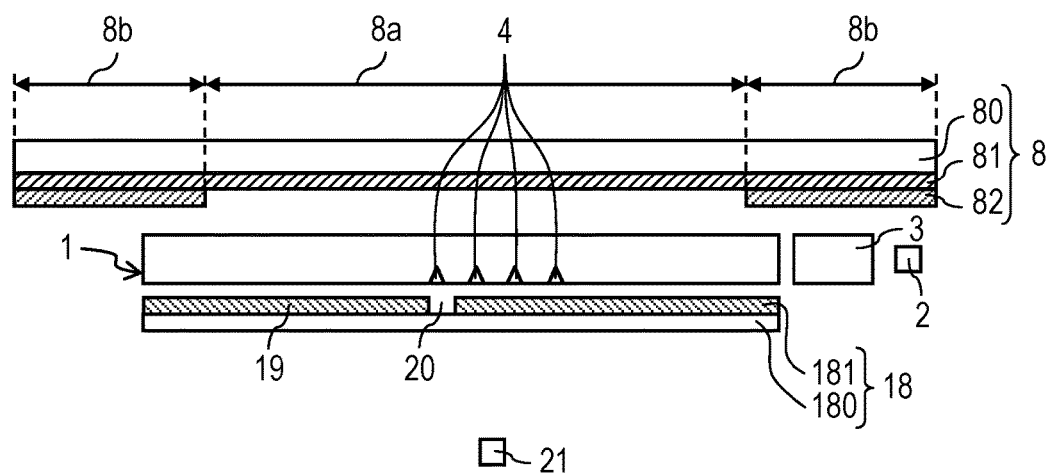
FIG. 8 is a sectional view illustrating another aspect of the display apparatus.

Here, in hiding plate 8, light shielding layer 82 may be provided on light transmission layer 81 formed of a material, such as a plate, which has a light transmitting property, and light transmission layer 81 and light shielding layer 82 may be formed on a transparent film, which becomes the base, and transparent plate 80 as illustrated in FIG. 8. Similarly, colored board 18 may be a plate having the light shielding property, and colored layer 181 may be laminated on the transparent film, which becomes the base, and transparent plate 180 as illustrated in FIG. 8.

Figure 9:
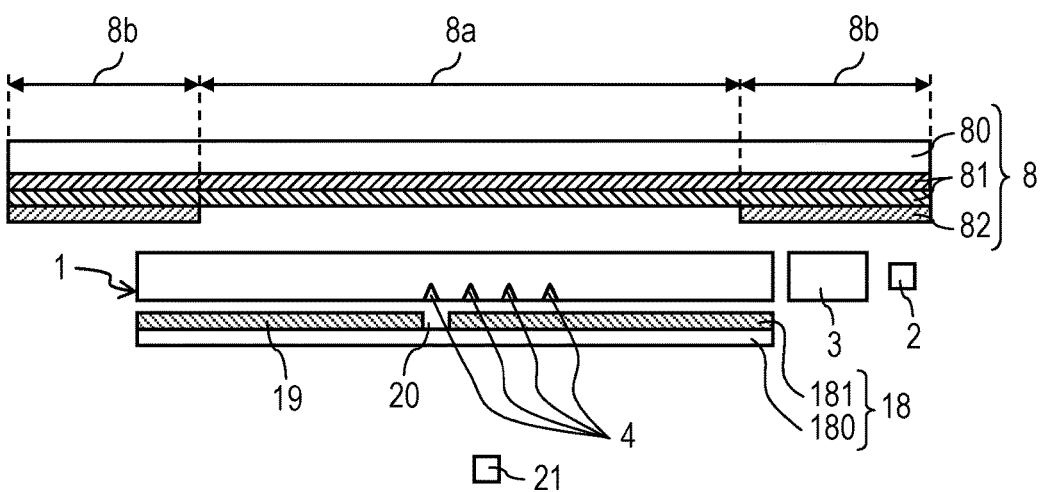
FIG. 9 is a sectional view illustrating further another aspect of the display apparatus.
Figure 10:
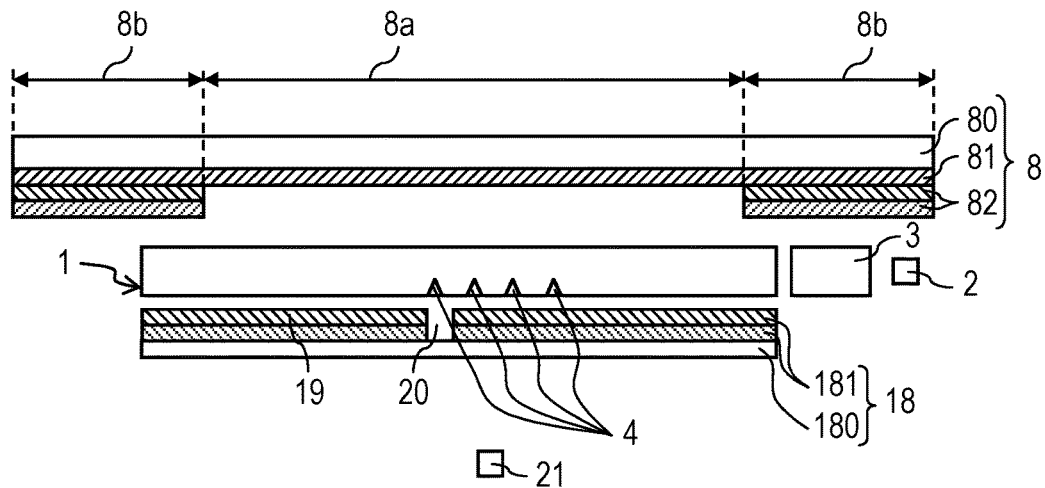
FIG. 10 is a sectional view illustrating still another aspect of the display apparatus.

In addition, light transmission layer 81 may be formed in such a way that a plurality of layers having the light transmitting property overlap as illustrated in FIG. 9, and light shielding layer 82 and colored layer 181 may be formed in such a way that the plurality of layers overlap as illustrated in FIG. 10. At least any one of the plurality of layers, which form light shielding layer 82 or colored layer 181, may have the light shielding property.

Meanwhile, as illustrated in FIGS. 7A and 7C, although light sources 2 are provided along the end surface of light guide plate 1 in the embodiment, the present disclosure is not limited to the aspect. For example, as illustrated in FIG. 11, light sources 2 may be provided on the side of the bottom surface of light guide plate 1.

Figure 11:
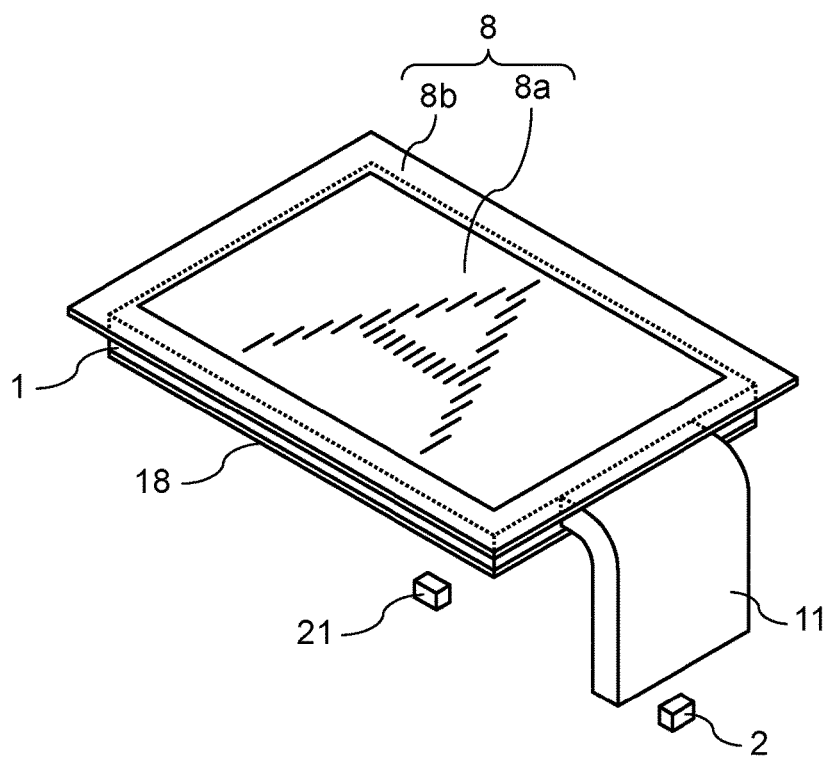
FIG. 11 is a perspective view illustrating still another aspect of the display apparatus.

In FIG. 11, light guide plate 1 includes leg part 11 that extends toward the side of the bottom surface from the end surface thereof. Light from light sources 2 is incident on leg part 11, changes a direction after being propagated in leg part 11, and is incident on the end surface of light guide plate 1. The progress of light thereafter is the same as in the description with reference to FIG. 1D.

Meanwhile, although first or second embodiment provides the display apparatus that switches between and display two pieces of information in one display area, the present disclosure is not limited to the aspect. For example, even in a case of a display apparatus that displays one piece of information in one display area, it is possible to acquire the display apparatus having good appearance in a case where the light sources are off as long as the colored board has a color close to the light shielding part and is provided on a side of a reflection surface of the light guide plate so as to overlap the light transmission part of the hiding plate.

Furthermore, in a case where a configuration is made such that light is incident on three or more end surfaces, three or more pieces of information may be switched. In addition, it is possible to switch between and display three pieces of information by combining the display apparatus, which switches between and displays two pieces of information by switching between light sources 2 and 5 as in the first embodiment, with colored board 18 provided with light transmitting areas 20 as in the second embodiment. Furthermore, as described above, in a case where a configuration is made such that light is incident on the three or more end surfaces, it is possible to switch between and display four pieces of information by combining the display apparatus, which switches between and displays three or more pieces of information, with colored board 18 provided with light transmitting areas 20 as in the second embodiment.

For example, the present disclosure contributes to improve qualities of a display apparatus which is used for an electronic machine and an apparatus for home use, industrial use, or a vehicle, or a display unit of a switch which has an input function.

What is claimed is:

1. A display apparatus comprising:
a light guide plate that propagates light which is incident from an end surface of the light guide plate, that reflects light using prisms provided on a reflection surface of the light guide plate, and that emits light from an emission surface of the light guide plate, the emission surface faces the reflection surface;
a light source that causes light to be incident on the end surface of the light guide plate;
a hiding plate that is provided on a side of the emission surface of the light guide plate, and that includes a light transmission part which transmits light emitted from the emission surface and a light shielding part which has lower light transmittance than the light transmission part;
a colored board that has light reflectance closer to light reflectance of the light shielding part than light reflectance of the light transmission part in each wavelength, and that is provided on a side of the reflection surface of the light guide plate so as to overlap the light transmission part of the hiding plate when viewed from a direction perpendicular to the emission surface of the light guide plate; and
a second light source that is provided to interpose the colored board between the second light source and the light guide plate,
wherein when viewed from a direction perpendicular to the emission surface of the light guide plate, an edge part of the colored board overlaps the light shielding part, and the colored board overlaps a whole area of the light transmission part,
wherein a plurality of the light sources are provided at a plurality of places such that light is incident on a plurality of end surfaces of the light guide plate and different pieces of information are respectively displayed on the end surfaces into which light is incident, and
wherein the colored board is provided with a light transmitting area that has higher light transmittance than light transmittance of another area.

2. The display apparatus of claim 1,
wherein a plurality of the light sources are provided at least two places such that light is incident on two end surfaces, which are orthogonal to each other, of the light guide plate.

3. The display apparatus of claim 1,
wherein a plurality of the light sources are provided at least two places such that light is incident on two end surfaces, which face each other, of the light guide plate.

4. The display apparatus of claim 1,
wherein the light transmittance of the light transmission part of the hiding plate is greater than 1% and less than 50%.

5. The display apparatus of claim 1,
wherein the light transmittance of the light shielding part of the hiding plate is equal to or less than 1%.

6. A display apparatus comprising:
a light guide plate that propagates light which is incident from an end surface of the light guide plate, that reflects light using prisms provided on a reflection surface of the light guide plate, and that emits light from an emission surface of the light guide plate, the emission surface faces the reflection surface;
a light source that causes light to be incident on the end surface of the light guide plate;
a hiding plate that is provided on a side of the emission surface of the light guide plate, and that includes a light transmission part which transmits light emitted from the emission surface and a light shielding part which has lower light transmittance than the light transmission part;
a colored board that has light reflectance closer to light reflectance of the light shielding part than light reflectance of the light transmission part in each wavelength, and that is provided on a side of the reflection surface of the light guide plate so as to overlap the light transmission part of the hiding plate when viewed from a direction perpendicular to the emission surface of the light guide plate; and
a second light source that is provided to interpose the colored board between the second light source and the light guide plate,
wherein when viewed from a direction perpendicular to the emission surface of the light guide plate, an edge part of the colored board overlaps the light shielding part, and the colored board overlaps a whole area of the light transmission part, and
wherein the colored board is provided with a light transmitting area that has higher light transmittance than light transmittance of another area.

7. A display apparatus comprising:
a light guide plate that propagates light which is incident from an end surface of the light guide plate, that reflects light using prisms provided on a reflection surface of the light guide plate, and that emits light from an emission surface of the light guide plate, the emission surface faces the reflection surface;
a light source that causes light to be incident on the end surface of the light guide plate;
a hiding plate that is provided on a side of the emission surface of the light guide plate, and that includes a light transmission part which transmits light emitted from the emission surface and a light shielding part which has lower light transmittance than the light transmission part;
a colored board that has light reflectance closer to light reflectance of the light shielding part than light reflectance of the light transmission part in each wavelength, and that is provided on a side of the reflection surface of the light guide plate so as to overlap the light transmission part of the hiding plate when viewed from a direction perpendicular to the emission surface of the light guide plate; and
a second light source that is provided to interpose the colored board between the second light source and the light guide plate,
wherein the colored board is provided with a light transmitting area that has higher light transmittance than light transmittance of another area.

* * * * *